June 19, 1962 A. SPAGNA ETAL 3,039,351

IMAGE REVERSING PRISM SYSTEM

Filed Aug. 24, 1960 2 Sheets-Sheet 1

INVENTORS
ANTHONY SPAGNA
EMANUEL SPAGNA

BY [signature]
ATTORNEY

IMAGE REVERSING PRISM SYSTEM

Filed Aug. 24, 1960 2 Sheets-Sheet 2

INVENTORS
ANTHONY SPAGNA
EMANUEL SPAGNA
BY
ATTORNEY

United States Patent Office 3,039,351
Patented June 19, 1962

3,039,351
IMAGE REVERSING PRISM SYSTEM

Anthony Spagna, Maspeth, and Emanuel Spagna, Corona, N.Y.

Filed Aug. 24, 1960, Ser. No. 51,603
1 Claim. (Cl. 88—1)

This invention relates to an image-reversing prism system and more particularly to a viewing device which is adapted to translate a reversed image so that it is made to appear in its familiar or "righted" position to a reader.

The recognition of a reversed image, as for example, the characters of the alphabet as they appear on a font of printers type, has long been a bar to speed and accuracy especially in the production of printed matter. It is well known, for example, that although the efficiency of mechanical activities in producing a publication resides with the skilled printing craftsman, proper supervision and direction in the placement of printed matter lies with an editorial staff member who, because of the requirements of speed, is required to be able to "read" alphabetical and other characters in reverse in order to check or approve, or properly furnish editorial directions to the printer.

It has likewise been found in other fields, as for example, in the fields of photography or lithography to name a few, where visualization of a reversed image is necessary in order to attain a desired effect, that interpretation of such a reversed image becomes important.

It is therefore an object of the present invention to provide an image-reversing system which is adapted to translate characters appearing in reverse so that they may appear in their "righted" or familiar and readily readable position.

Another object of the present invention is the provision of an image reversing system which will enhance the readability of relatively small characters in their "righted" position.

A further object of the present invention is to provide a device incorporating an image reversing system which will be relatively inexpensive, and simple to manufacture.

In general, achievement of the foregoing objects and advantages is secured by providing a pair of triangular prisms in a particular relationship adapted to reverse a reflected image so that it is made to appear in its familiar or "righted" position. Provision is further made for enlarging and thus enhancing the readability of the image so reversed as well as providing means whereby such a system may be adapted to be worn upon the head of the user when in use or alternately to be placed in convenient relationship to the matter being "translated."

Other objects and inventive characteristics of this new and unique structure will become apparent to those versed in the art from the following description of a particular embodiment of the present invention as illustrated in the drawing, in which.

Figure 1:
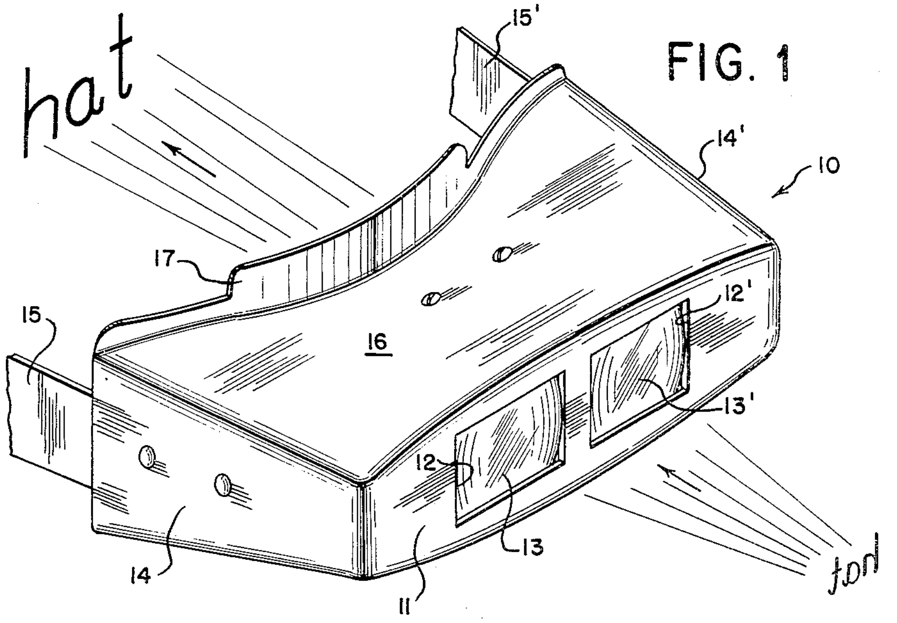
FIG. 1 is a perspective view of a housing containing the prism system of the present invention.
Figure 3:
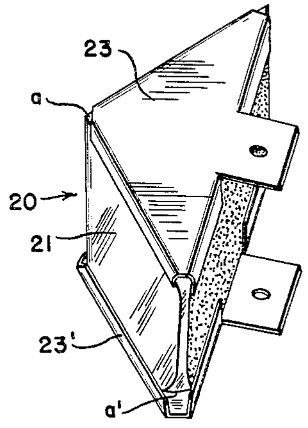
FIG. 3 is a view of a prism having brackets for securing the prism within a housing.
Figure 2:
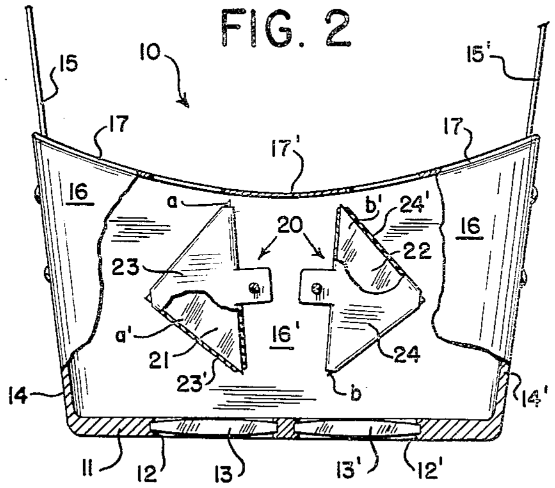
FIG. 2 is a top plan view of the frame as illustrated in FIG. 1 showing the prism system therein.

Referring now to the drawings, the image reversing prism system of the present invention is incorporated in a housing 10 such as a spectacle frame comprising a base portion 11, having a pair of apertures 12, 12' at the front thereof, adapted to retain a pair of magnifying lenses 13, 13' therein. Extending rearwardly from opposite sides of said base portion 11 there are provided side portions 14, 14' and ear pieces 15, 15' or like securing means adapted to retain the housing 10 securely upon the head of a user. Bridging the area between each of said side portions 14, 14' and extending rearwardly, there are provided an upper and lower hood portion 16, 16' respectively, the rear edges 17, 17' thereof being generally arcuate to fit the contour of the face of a user. The side portions 14, 14' and the hood portions 16, 16' extend rearwardly from the base portion to form a housing of sufficient depth within which the prism system 20 of the present invention may be retained.

The image reversing prism system 20, comprises two prisms 21, 22, each being a reflecting 45°—45°—90° prism. Each of said prisms 21, 22 are further provided with a set of triangular brackets 23, 23', 24, 24' adapted to fit over the side surfaces *a*, *a'*, *b*, *b'* of said prisms and are swivelly secured, as by bolting, to the inner surfaces of the hood portions 16, 16'. In securing said prisms 21, 22 within the housing 10, each of said prisms is aligned so that the hypotenuse surfaces thereof are in substantially parallel relationship to the other.

Figures 4, 5:
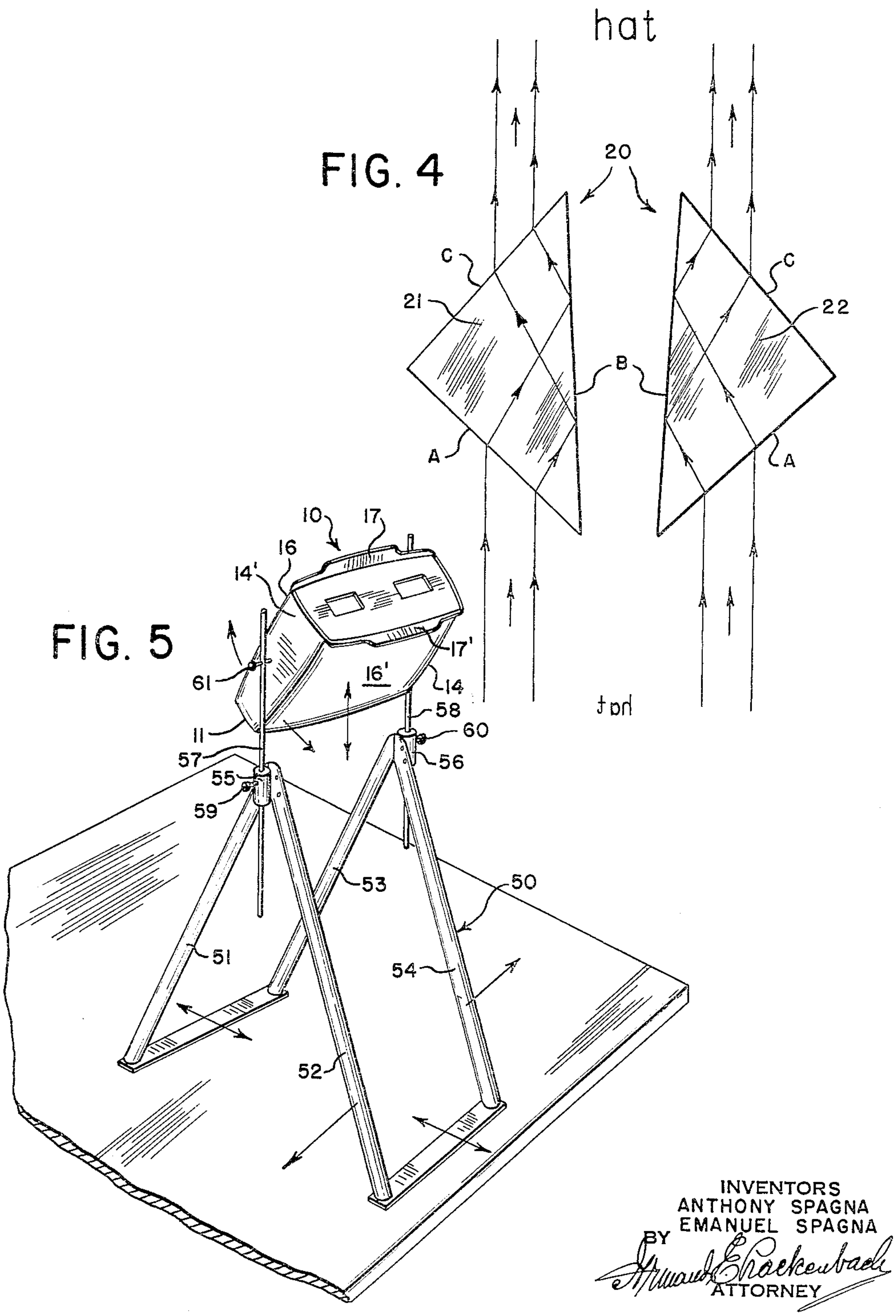
FIG. 4 is a diagrammatic view showing the path taken by a beam of light through the prism system of the present invention.
FIG. 5 is a view of a housing for retaining the prism system of the present invention mounted upon an adjustable frame.

As illustrated in FIG. 4 a beam of light entering upon surface A is reflected upon hypotenuse surface B where the image is reversed and thence reflecting upon surface C emerges therefrom as a "righted" image.

Since it is recognized that a 45°—45°—90° commercial prism is often imperfect, so that even slight variations of its angles will distort the reversed images, it has been found that such distortions may be corrected by adjusting said prisms 21, 22 so that the forward 45° angles are in closer relationship to each other, than the rear 45° angle. Thus by positioning such 45° forward angles inwardly within a range of 12° from a 180° parallel relationship, any distortion because of imperfections of such prisms will be corrected.

It is to be noted that various modifications and adaptations of the present invention may be made without constituting a departure from the spirit and scope of the invention as herein described and defined. For example, although a housing, such as a spectacle frame, has herein been described as retaining means for the image reversing prism system of the present invention, such housing 10 may additionally be mounted, for example, upon a frame 50 as illustrated in FIG. 5, so that reversed images may be examined from above. Such frame 50 generally comprises sets of legs 51, 52, 53, 54, adapted to rest upon a substantially flat surface upon which matter to be scanned is placed. The upper ends of such legs are secured to tubular sleeves 55, 56 permitting rods 57, 58 to be slidably inserted therein. The tubular sleeves 55, 56 are further provided with securing means 59, 60 therein to lock rods 57, 58 at any desired position. The uppermost end of rods 57, 58 are adjustably secured to the side portions 14, 14' of housing 10, with securing nuts 61 so as to permit housing to swivel into a desired position and be locked. It is further to be noted, that although the hypotenuses of said prisms are described in the embodiment as being substantially in parallel relationship, the results herein attained may be equally arrived at by placing said prisms so that the substantial parallel relationship of the hypotenuses is reversed with the 90° angles of the prisms lying inwardly. Mention is further made of the fact that the magnifying lenses may be placed equally as well at the rear of the housing 10 rather than in the base 11 thereof.

We claim:

An image reversing system comprising a pair of

45°—45°—90° prisms, a housing having a laterally extending base portion; side portions extending rearwardly from said base portion; said base portion having a pair of apertures therein; and a magnifying lens within each of said apertures having their respective optical axis parallel, said magnifying lenses adapted to magnify an image of an image carrying beam of light passing therethrough; a hood portion bridging said side portions at the top and bottom thereof; a plurality of triangular brackets encasing the sides of said prisms; said brackets being secured within said hood portion and mounting said prisms directly behind said magnifying lenses, the hypotenuses of said prisms being disposed within the range of from 12° inwardly to 18° outwardly from a 180° parallel relationship with respect to the optical axis of said magnifying lenses, whereby an image of an image carrying beam of light passing through said magnifying lenses is reversed by said prisms; a plurality of leg members adapted to rest upon a flat surface and be movable thereupon; said leg members, at the top thereof, being secured to a tubular sleeve; a vertical member projecting through said sleeve being swivelly secured to the side portion of said housing; securing means in said sleeve adapted to adjustably secure said vertical member.

References Cited in the file of this patent

UNITED STATES PATENTS 1,850,153 Paroselli ---------------- Mar. 22, 1932
2,528,673 Taylor ------------------ Nov. 7, 1950

FOREIGN PATENTS 185,580 Austria ----------------- May 11, 1956